(12) United States Patent
Brown et al.

(10) Patent No.: US 6,556,987 B1
(45) Date of Patent: Apr. 29, 2003

(54) AUTOMATIC TEXT CLASSIFICATION SYSTEM

(75) Inventors: Daniel Brown, London (GB); Benjamin Janes, Stroud (GB)

(73) Assignee: Applied Psychology Research, Ltd., London (GB)

( * ) Notice: Subject to any disclaimer, the term of this patent is extended or adjusted under 35 U.S.C. 154(b) by 356 days.

(21) Appl. No.: 09/615,295

(22) Filed: Jul. 13, 2000

(30) Foreign Application Priority Data

May 12, 2000 (GB) .............................................. 0011543

(51) Int. Cl.$^7$ .............................................. G06F 17/30
(52) U.S. Cl. ........................ 707/3; 707/2; 707/6; 707/7
(58) Field of Search ............................. 707/3, 10, 2, 6, 707/7

(56) References Cited

U.S. PATENT DOCUMENTS

| | | |
|---|---|---|
| 5,325,298 A | 6/1994 | Gallant |
| 5,781,879 A | 7/1998 | Arnold et al. |
| 5,905,980 A | 5/1999 | Masuichi et al. |
| 5,933,822 A | 8/1999 | Braden-Harder et al. |
| 5,941,944 A | 8/1999 | Messerly |
| 5,974,412 A * | 10/1999 | Hazlehurst et al. ........... 707/10 |
| 6,125,362 A | 9/2000 | Elworthy |
| 6,161,130 A | 12/2000 | Horvitz et al. |
| 6,192,360 B1 | 2/2001 | Dumais et al. |
| 6,253,169 B1 * | 6/2001 | Apte et al. ..................... 704/9 |
| 6,289,353 B1 * | 9/2001 | Hazlehurst et al. ......... 707/101 |
| 6,389,436 B1 * | 5/2002 | Chakrabarti et al. ........... 707/3 |
| 6,418,432 B1 * | 7/2002 | Cohen et al. ................... 707/5 |

OTHER PUBLICATIONS

"Autonomy Technology Whitepaper": Autonomy—Knowledge Management and New Media Content Solutions, Apr. 6, 2000, pp. 1–11.
"Autonomy Unveils New Platform for Applications Using Unstructured Data": Autonomy—Knowledge Management and New Media Content Solutions, Apr. 6, 2000, pp. 1–6.

* cited by examiner

*Primary Examiner*—Jean M. Corrielus
(74) *Attorney, Agent, or Firm*—Frishauf, Holtz, Goodman & Chick, P.C.

(57) ABSTRACT

An automatic text classification system is provided which extracts words and word sequences from a text or texts to be analyzed. The extracted words and word sequences are compared with training data comprising words and word sequences together with a measure of probability with respect to the plurality of qualities. Each of the plurality of qualities may be represented by an axis whose two end points correspond to mutually exclusive characteristics. Based on the comparison, the texts to be analyzed are then classified in terms of the plurality of qualities. In addition, a fuzzy logic retrieval system and a system for generating the training data are provided.

14 Claims, 3 Drawing Sheets

| GROUP / AXIS | G0 | G1 | G2 |
|---|---|---|---|
| 1 | | | |
| 2 | | | |
| 3 | | | |
| 4 | | | |
| 5 | | | |
| w, pw, p2w | No. | dVAL |
|---|---|---|
| happ | 5 | |
| happ, very | 2 | |
| happ, very, very | 1 | |
| lov | 3 | |
| | | |
Fig.5
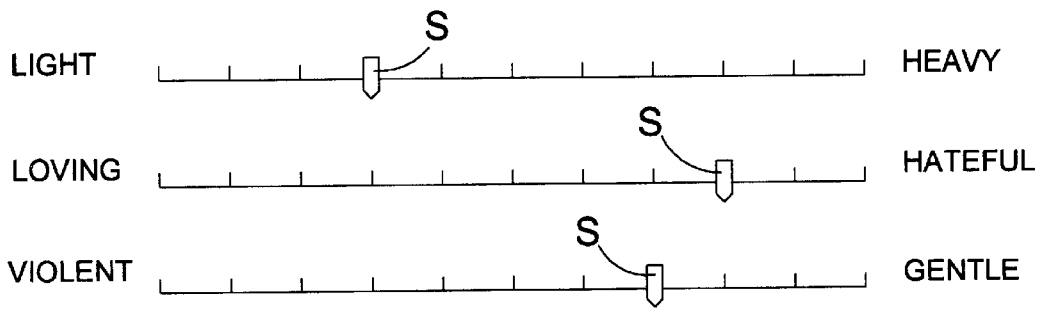
Fig.6
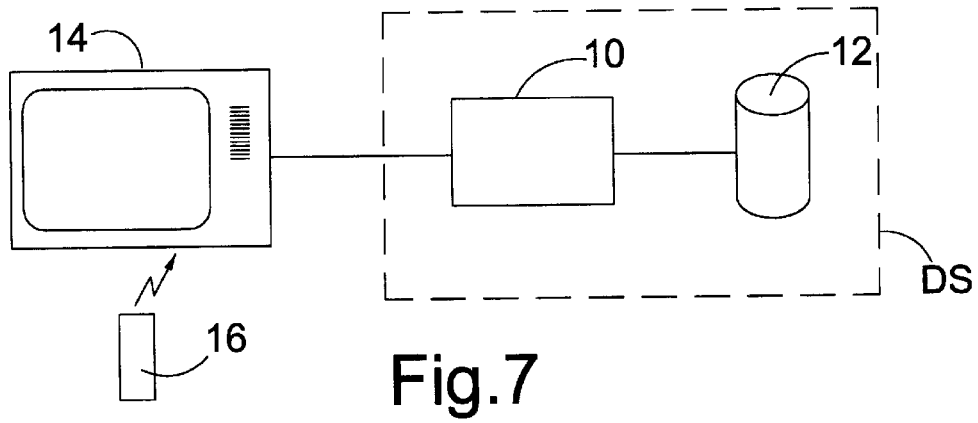
Fig.7

AUTOMATIC TEXT CLASSIFICATION SYSTEM

The present invention relates to an automatic text classification system, and more specifically to a system for automatically classifying texts in terms of each of a plurality of qualities in a manner such that the classified texts can be automatically retrieved based on a specified one or more of the plurality of qualities. The invention also relates to a retrieval system using the plurality of qualities.

BACKGROUND OF THE INVENTION

A variety of methods are known for automatically classifying and/or analyzing text, including keyword searching, collaborative filtering, and natural language parsing.

Keyword searching methods operate by simply looking for one or more keywords in a text and then classifying the text based on the occurrence (or non-occurrence) of the keywords. Keyword searching methods, however, suffer from the drawbacks that the main concept or a given text may be unrelated to the keywords being searched, and/or that a particularly relevant text may not contain the keywords being searched.

Collaborative filtering methods work by attempting to make recommendations and/or classifications based on matching overlapping results. For example, if a collaborative filtering system were used to analyze a series of questionnaires asking people to name their favourite musicians, the system would analyze the questionnaires by looking for an overlap in one or more of the musicians named in respective questionnaires. If an overlap were found between two questionnaires, the other musicians named by the author of the first questionnaire would be recommended to the author of the second questionnaire, and vice versa. The drawback of collaborative filtering, however, is that it assumes that people's tastes that are similar in one respect are also similar in other respects. That is, collaborative filtering methods fail to take into account the underlying qualities that define people's tastes.

Natural language parsing methods operate by performing semantic or lexical analysis based on rules of grammar and lexicons. To date, however, computers have been unable to fully understand natural language, and known natural language parsing methods too often misinterpret the actual meaning of text.

The above described drawbacks of keyword searching, collaborative filtering, and natural language parsing have created a need for more accurate and more meaningful text classification methods.

Recently, a company called Autonomy, Inc. has developed technology that is capable of analyzing text and identifying and ranking main ideas. As disclosed in the "Autonomy Technology Whitepaper" (available at www.autonomy.com), Autonomy's technology can analyze text and identify key concepts based on a statistical probability analysis of the frequency and relationships of terms in the text that give the text meaning. Once the key concepts have been extracted from a text, "Concept Agents" are created to seek out similar ideas in any other texts such as websites, news feeds, email archives or other documents. In addition, the "Autonomy Technology Whitepaper" discloses that the "Concept Agents" can be used to create specific user profiles based on an analysis of the texts that a particular user reads, or that the "Concept Agents" can be used to make users aware of others with similar interests. Still further, the "Autonomy Technology Whitepaper" discloses that the "Concept Agents" can be used to automatically sort documents into predefined categories.

Indeed, by identifying key concepts based on a statistical probability analysis of the frequency and relationships of terms in a text that give the text meaning, Autonomy's technology represents a significant advance over other known text searching techniques. However, by focusing on key concepts or "Concept Agents", Autonomy's technology fails to identify the underlying qualities of the subject matter described in the text.

For example, if Autonomy's technology were used to analyze a textual film synopsis, the extracted key concept would be films, and the film might even be classified into a predefined category such as comedy, romance, action/adventure or science fiction. However, Autonomy's technology would fail to identify whether the text relates to, for example, a happy or sad film, a funny or serious film, a beautiful or repulsive film, a tame or sexy film, and/or a weird or conventional film. In this connection, it is pointed out that a romantic film, for example, can be each of happy or sad, funny or serious, beautiful or repulsive, tame or sexy, and weird or conventional. Accordingly, if a user were to access a data base of textual film synopses classified using Autonomy's technology, the user would only be able to search for a desired film within the static, predefined categories into which the films were classified. Thus, if a user wanted to find a film that is each of happy, funny, repulsive, sexy and weird, Autonomy's technology would be of little help.

OBJECTS OF THE INVENTION

It is an object of the present invention to provide a system for automatically classifying texts in terms of each of a plurality of qualities that are determined based on a statistical probability analysis of the frequency and relationships of words in the text.

It is also an object of the present invention to provide a system for automatically classifying texts in a manner such that the classified texts can be automatically retrieved using a "fuzzy logic" retrieval system capable of identifying a best match based on a specified one or more of a plurality of qualities.

SUMMARY OF THE INVENTION

An automatic text classification system is provided which extracts words and word sequences from a text or texts to be analysed. The extracted words and word sequences are compared with traiding data comprising words and word sequences together with a measure of probability with respect to the plurality of qualities. Each of the plurality of qualities may be represented by an axis whose two end points correspond to mutually exclusive characteristics. Based on the comparison, the texts to be analysed are then classified in terms of the plurality of qualities. In addition, a fuzzy logic retrieval system and a system for generating the training data are provided.

BRIEF DESCRIPTION OF THE DRAWINGS

The present invention will now be described with reference to the accompanying drawings, in which:

FIG. 5 shows a schematic view of classification information that is output from the learning algorithm;

FIG. 6 shows an example of a graphical user interface of a "fuzzy logic" retrieval system for retrieving a classified text based on user specified values along the classification axes; and FIG. 7 shows a block schematic diagram of an embodiment of a retrieval system according to one aspect of the present invention.

DETAILED DESCRIPTION

Figure 1:
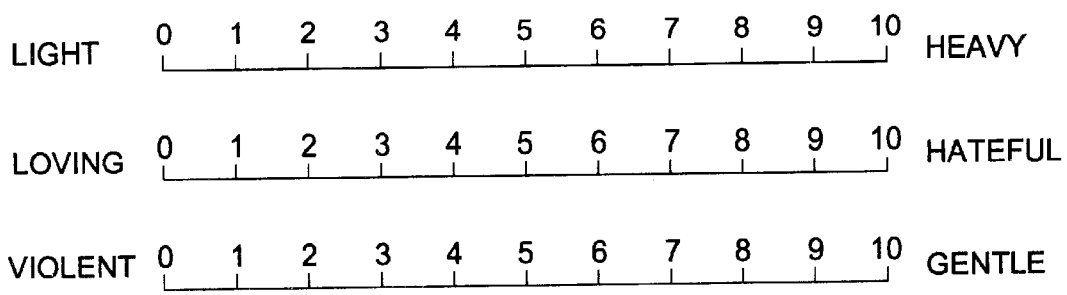
FIG. 1 shows examples of classification axes used according to one embodiment of the present invention.

The classification system according to the present invention broadly comprises two aspects: a training component and a classification component. Before describing the training component and classification component in detail, a broad overview and some specific features of the present invention will first be described.

Firstly, underlying both the training and classification aspects of the invention is a multiple-word analysis technique for analysing text to extract therefrom single words ("singles"), and multi-word sequences such as word pairs ("doubles"), three-word sequences ("triples") and so on. To take a very simple example, a text describing a film may describe the film as "exciting". The presence of such a word will generally have an effect on the classification of the associated film. However, if the word "very" precedes the word "exciting" then it would be expected that this pair of words (double) would have a more profound effect on the classification of the underlying film. The process may be extended to three-word sequences (triples), for example "very very exciting". The following description relates to analysis of doubles and triples only for ease of explanation, the invention also applies to quadruples, quintuples and so on.

In the embodiments of the present invention described below, words such as "exciting" or "happy" which have a clear and independent meaning are referred to as main stem words. Words that do not have an independent meaning are referred to as common words. Examples of common words are "the" and "a". A subset of common words that have no independent meaning but that alter or enhance the meaning of following words are referred to as modifying words. Examples of modifying words are "very", "many", "not", "highly" and so on. In the English language, there are [258] common words. A full list of the common words and modifying words is included in Appendices 1 and 2 respectively.

A significant preferred feature of the present invention is that texts are classified in terms of qualities that are represented by classification axes whose end points correspond to mutually exclusive characteristics. To return to the example of a film, a description of a film may include words such as "happy", "thrilling", "violent" and so on. One classification approach would be to provide a single numeric score for each of these characteristics. However, it is much preferred to provide axes upon which scores represent two mutually exclusive characteristics. A straightforward example would be a single axis (set of scores) which represents the complete range between happy and sad. In the following examples, a score of between 0 and 10 is used. Consequently, a film whose description obtains a score of 0 on this axis could be expected to be very happy while a film whose description scores 10 can be expected to be very sad.

In the embodiments described below, there is no particular emphasis to be placed on the 11-point score. The lower value of 0 has been chosen to readily comply with computer programming conventions while an 11-point scale provides a good compromise between accuracy of classification and complexity of processing. Nevertheless, it is possible for each axis to comprise only two scores. It is preferred, however, to provide an odd number of scores along the axis so that a middle value (or neutral value) exists. This allows a score to be placed on each axis that is either indicative of one or the other of the mutually exclusive characteristics or neutral. In other words, in the example of the happy-sad axis, an odd number of scores would enable a film to be classified as either happy or sad, or as neither particularly happy nor particularly sad.

A number of different axes are provided in the following embodiments so that, for example, a film can be allocated a score in numerous different areas. In addition to happy-sad, these might include loving-hateful, violent-gentle and so on. According to one example, 17 axes can be used. The number of axes will depend on the field to which the invention is applied. Generally speaking, the inventors have found that a number of axes of between 10 and 14 provides a good compromise between accuracy of classification and processing overhead.

The following example uses a Bayesian algorithm but others could readily be used.

The Training System

The training system broadly comprises two parts. First, a manual classification of a plurality of pre-selected training texts in terms of each of a plurality of qualities and second, an automatic text analysis of each of manually classified training texts. The object of the training system is to generate an output of singles, doubles and triples of word stems and word stem sequences together with a value on one or more axes to enable classification of subsequently-analysed documents that contain the same words or combinations of words.

As a first step, suitable training texts are chosen. These should include both relevant vocabulary and also represent a reasonable distribution of items over a broad range of the relevant qualities. For example, if all of the training texts selected related to horror films, then the training data produced therefrom would probably not be capable of accurately classifying texts relating to romantic, humorous or other films. If the training data output by the training system is found to be skewed, this can be remedied by further training.

Human reviewers read the training texts and allocate for each training text a score between 0 and 10 on each of the 17 axes shown in table 1 below. FIG. 1 shows three of these axes in pictorial form. FIG. 1 also illustrates groups along these axes which will be described further later on.

TABLE 1

| | Emotional Profile |
|---|---|
| (1) | Light - Heavy |
| (2) | Loving - Hateful |
| (3) | Violent - Gentle |
| (4) | Happy - Sad |
| (5) | Sexy - NonSexy |
| (6) | Fearful - Comfortable |
| (7) | Funny - Serious |
| (8) | Surprising - Methodical |
| (9) | Horrifying - Beautiful |
| (10) | Inspirational - Bleak |

TABLE 1-continued

Content Profile

| | |
|---|---|
| (11) | Historical - Futuristic |
| (12) | Fast paced - Slow paced |
| (13) | Educational - Entertaining |
| (14) | Weird - Conventional |
| (15) | Escapist - Challenging |
| (16) | Short - Long |
| (17) | Intellectual - Easy Viewing |

Where the training text is regarded as neutral in a particular category, a score of 5 can be allocated. The strength of the non-neutrality of each training text will then be scored subjectively by the reviewer using the other 10 possible scores on the axis. Preferably, the training texts are each provided to a number of different reviewers so as to avoid extreme views providing skewed data. Still further preferably, the work of the human reviewers is moderated by a peer review process.

Figure 3:
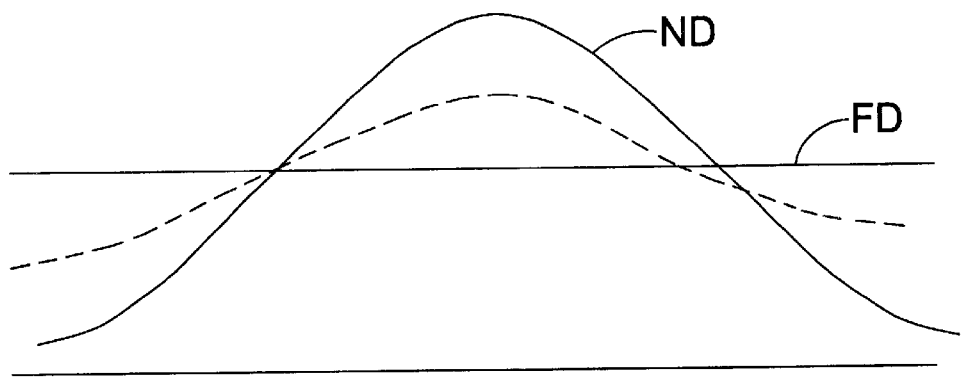
FIG. 3 shows a preferred distribution of the training data produced from the training texts.

The training texts are ideally chosen to represent a spread along all of the possible scores along each axis. It has been found that the most advantageous distribution lies between a Bell curve (i.e., normal distribution ND) and a flat-distribution (FD) for each axis. This is shown in FIG. 3 where the distribution between ND and FD is shown as a dotted line. As a result, there should be a reasonable quantity of training data relating to each of the possible scores on each axis. While it is preferred that there is a higher amount of training data towards the centre of each axis, the preferred distribution ensures that there are at least some training data relating to the extremes of the axis. Also, while the distribution lying somewhere between a flat distribution and a Bell curve is preferred, it has been found that the system still operates well even when the distribution of the training data differs from this ideal. The feedback process described later on has relevance to this.

The result of the manual classification process is a series of scores (i.e., one on each axis) for each of the training texts. As described hereinabove, these scores preferably represent balanced values produced by a number of reviewers and moderated by a peer review process. It has been found that using approximately 500 training texts provides a good compromise between the amount of work required and the classification accuracy of the subsequently trained system. However, halving the number of training texts has been found not to seriously degrade the performance of the system. Each training text, by the way, preferably contains at least 40 words so as to provide a broad vocabulary for enabling accurate classification.

Figure 2:
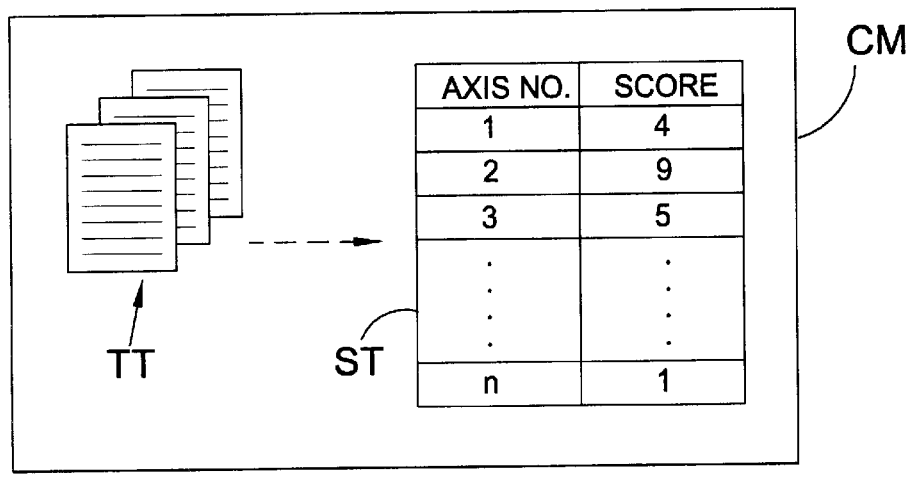
FIG. 2 is a schematic representation of the output of a first, manual classification that is performed for each of a plurality of training texts.

The scores allocated on each axis for each document are stored electronically and are indexed (using any suitable database technique) to the respective training texts. The output is illustrated schematically in FIG. 2 where a plurality of training texts TT are stored in a computer memory CM such as a hard disk drive. Associated with each Training Text (illustrated by dotted line) is a table or Score Table ST. The Score Table shown comprises two columns, namely an axis number and a score for each axis. Well known memory management techniques can be used to efficiently store the information. For example, a document number could simply be followed by n scores in a data array, thereby eliminating the storage of the axis identification numbers.

The training system has as its object to establish a relationship between extracted word stems and word stem sequences with the objective scores provided by the manual classification procedure. There are basically two parts to this process: textural analysis and group allocation. These will be described in turn.

Each sentence of the training text is pre-processed and then analysed to generate singles, doubles and triples that are used to populate a decision tree (described later). The preprocessing removes insignificant information and eases subsequent processing. The pre-processing comprises the following steps:

1. Conversion of all of the text into lower case characters.
2. Removal of any punctuation marks.
3. Removal of all numbers.
4. Removal of any apostrophes and any letters after those apostrophes.
5. Removal of any characters not in the a–z alphabet.
6. Discarding any words having more than 30 characters.

Consequently, the following sentence:

"It was being driven too fast, the magistrate's car."

Would become:

"it was being driven too fast the magistrate car"

Figure 4:
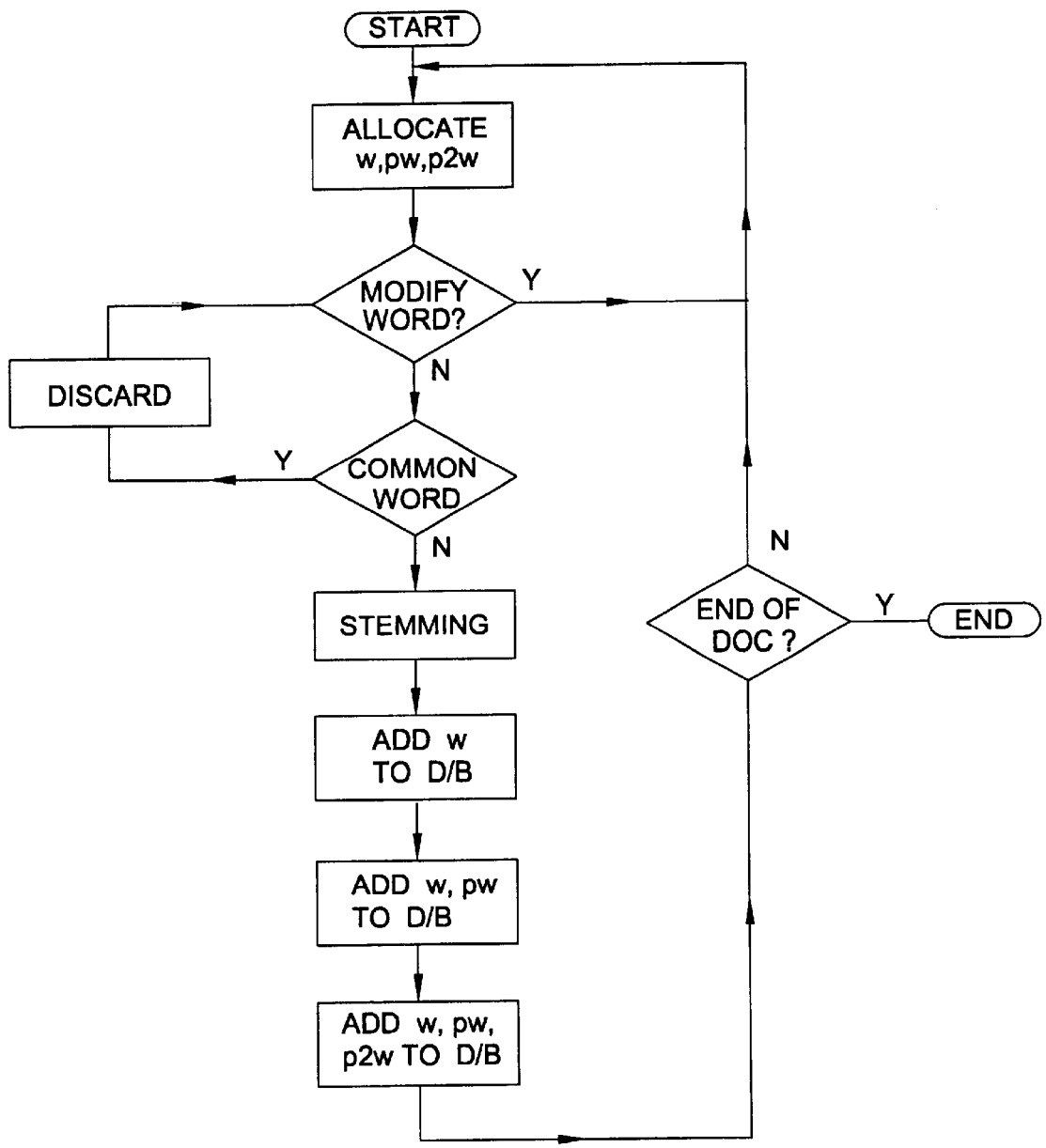
FIG. 4 shows a flow chart of the learning algorithm according to one embodiment of the present invention.

The sentence is then processed by the algorithm illustrated in the flow chart of FIG. 4 in terms of three variables—namely "w" (corresponding to single word stems), "pw" (corresponding to a double) and "p2w" (corresponding to a triple). More specifically, the system works through the sentence from start to finish allocating words from the sentence to these variables and, where appropriate, adding singles (w only), doubles (pw followed by w) and triples (p2w followed by pw followed by w) to the output database as appropriate.

At the first stage, therefore the first word of the sentence is allocated to the variable w. Because there is no word preceding the first word, the variables pw and p2w are both allocated to "NAW" which means "not a word".

The next step is to determine whether "w" is a modifying word. (As described hereinabove, a modifying word is a word which is too common to indicate a particular characteristic but which plays an important role as a preceding word (pw or p2w)—good examples of modifying words are "very" and "not".) Where "w" is such a modifying word the further steps of the analysis procedure are bypassed and the variables w, pw and p2w are updated.

To perform updating the variable w is then allocated to the word that follows the first word in the sentence, the word previously allocated to the variable w is allocated to the variable pw, and the variable p2w is allocated to NAW. It is then determined whether the updated word w is a modifying word. If so, then the remaining steps are bypassed and the contents of w, pw and p2w are updated again. If w is not a modifying word then the processing continues to determine if w is a common word. If w is a common word, then it is discarded. (As described hereinabove, and as listed in Appendix 1 there are 258 common words in the English language, including such words as "the" and "a".) The variable w is then allocated to the following word which is then analysed to determine whether it is a modifying word, common word and so on. At this point, the full update procedure is not applied since the preceding words (pw and p2w) are not yet to be changed.

If the word w passes these tests it is understood to be a significant word or "main stem word". The word w is passed to a stemming algorithm (one well known example is the Porter stemming algorithm) in order to convert the word to its stem or root. Consequently, the words "loveable", "love" and "loving" will all stem to "lov". This ensures that words indicating a common concept are grouped together for further processing regardless of tense and whether they are nouns, verbs, adjectives and so on.

Word w is then added to the output database. Where the word w has occurred previously in the document, then a count of the number of occurrences is increased. The word w is stored on its own and with its two previous words, pw and p2w (i.e. as a single, double and triple) in a database.

It is worth noting at this point that the designation of a variable as "NAW" is significant and doubles or triples which include NAW are important and should not be discarded or stored by the system only as a single or a double. The reason is that this means that the stem word or stem word and first previous word (where p2w equals NAW) occur at the start of a sentence where, generally speaking, more significant concepts are to be found.

Processing then precedes to update the contents of variables w, pw and p2w and the above described analysis is repeated.

The following example illustrates the procedure on an actual sentence, wherein pre-processing has already been performed:

"we saw a clown in the park on a sunny day"

The following numbered paragraphs refer to one iteration of the above described algorithm shown in FIG. 4.

1. The variables are allocated as follows: w="we", pw="NAW", p2w="NAW". The system compares the variable w with its list of modifying words and determines that it is such a word. Consequently, the word "we" is allowed to be a previous word (pw or p2w) but it is not suitable for use as a stem word. The word "we" is therefore retained but no additions are made to the output database at this stage.

2. The variable w is updated and the variables are now as follows: w="saw", pw="we", p2w="NAW". The system then compares the word "saw" with its list of common words and discovers a match. Consequently, the word "saw" is deleted (or at least ignored in the subsequent procedure) and no additions are made to the output database at this stage.

3. The variables are updated to be as follows: w="a", pw="we", p2w="NAW". At this point, the system determines that the word "a" is a modifying word and so it is allowed to be a previous word (pw or p2w) but it is not suitable for use as a stem word. The word "a" is therefore retained but no additions are made to the output database at this stage.

4. The variable w is updated so that the variables are as follows: p="clown", pw="a" and p2w="we". It will be apparent that there is now some meaning inherent in these words. The system checks the word "clown" against the list of modifying words and common words and fails to find a match in each case. The word "clown" is therefore applied to the stemming algorithm and is converted to its stem "clown"]. At this point, the algorithm has identified some meaning to this pair of words and so the following information is added to the output database Stem word="clown" occurrence=1
Stem word="clown", previous word="a" occurrence=1
Stem word="clown", pw="a", p2w="we" occurrence=1

If, for example, the single (i.e., w), the double (i.e. pw and w) or the triple (i.e., p2w and pw and w) has already occurred in the training text, then it will not be added afresh but rather the number of occurrences will be increased by one.

5. The variables are updated to: w="in", pw="clown", p2w="a". The variable w is compared with the databases of modifying and common words and it is determined to be the former. The word "in" is therefore retained but nothing is added to the database at this stage.

6. The variables are then updated to w="the", pw="in", p2w="clown". The comparison with the common word and modifying word databases indicates that this word should be retained but not added to the database.

7. The variables are then updated to w="park", pw="the", p2w="in". The word "park" is neither a modifying word or a common word and so it is applied to the stemming algorithm. The output is "park". The following information is then added to the output database.

Stem-word="park" occurrence=1
Stem-word="park", pw="the" occurrence=1
Stem-word="park", pw="the", p2w="in" occurrence=1

8. The contents of the variables are then updated such that: w="on", pw="park", p2w="the". Comparison of the word "on" illustrates that this is a modifying word and should be retained but not stored in the database as a stem word.

9. The variables are then updated to w="a", pw="on", p2w="park". Comparison of the word "a" indicates that this is a modifying word and should be retained but not stored in the database as a stem word.

10. The variables are updated to w="sunny", pw="a", p2w="on". Comparison with the databases of modifying words and common words illustrates that "sunny" is a stem-word. It is consequently applied to the stemming algorithm and converted to "sunni". The following information is then added to the output database:

Stem-word="sunni" occurrence=1
Stem-word="sunni", pw="a" occurrence=1
Stem-word="sunni", pw="a", p2w="on" occurrence=1

11. The variables then updated such that w="day", pw="sunni", and p2w="park". The algorithm detects that the word "day" is not a modifying word but that it is a common word and is hence discarded.

The processing of the exemplary sentence is now complete, and the relevant information is then stored in a database. Further sentences will be processed in the same manner. More specifically, the data generated by the sentence deconstruction algorithm shown in FIG. 4 must be stored in a manner which associates that data with the scores provided by the human processing. This is what allows the subsequent classification algorithm to classify the new documents which contain the words and word sequences that occurred in the training texts.

In order to perform this storage the 11 score values on each axis are amalgamated into groups G0, G1 and G2. (Again, it is noted that the selection of zero in the present embodiment is dictated by computer programming conventions and has no special significance). Each word and word sequence identified in the above-described procedure is then stored together with the appropriate group, G0, G1, G2. In this embodiment, the group G0 comprises the scores 0 to 3 inclusive, the group G1 comprises the scores 4, 5 and 6, and the group G2 comprises the scores 7–10 inclusive. The group G1 is consequently a "neutral" group while the other two are indicative of more extreme values on each axis. These are shown in FIG. 1.

To take a specific example, imagine that the stem "happi" occurred once during analysis for training document. The training document was allocated a score of 2 on the Happy-Sad axis by the human reviewers (indicating that they felt it was quite happy but not extremely so). The word stem "happi" will then be stored in group G0 on the Happy-Sad axis. This is shown in FIG. 5. This process will be repeated for all of the other axes with respect to the group on each axis into which the text has been classified by the human reviewers.

Some anomalies may be generated during this procedure. Such anomalies may be caused by words being used in an unusual context or by errors in the preparation of the original document. This is why a large number of training texts are preferably used to produce the training data.

To return to the example of the Happy-Sad axis, the stem "happi" will be expected to occur most frequently in group G0 of this axis. After analysis of all of the training texts the stem "happi" might have the following scores (number of occurrences):

G0=50, G1=20, G2=12.

Thus, when this word stem "happi" is found in a new text the training data can be used to provide an indication that the document should be placed in group G0 on the Happy-Sad axis. This will be discussed in more detail below.

One example of a calculation of the likelihood or probability of occurrence of each of the stem words, doubles and triples will now be described. It should be noted that, while a mathematical probability is given in the following examples, this need not be the case in practice. The term probability should be read to encompass any score indicative of a likelihood of occurrence. For each word stem 'w':

$$dVal(w) = \frac{(1 + \text{number of occurrences } (w))}{\left(\text{Number of distinct stems on axis: } a + \text{number of words in group: } g\right)}$$

The number of occurrences of the word w in the training data therefore increases the value of dVal(w). However, by placing the number of word stems on the particular axis and the number of words in the group in which the word stem occurs in the denominator, dVal represents the likelihood or frequency of occurrence of the word stem in the training data. Placing a 1 in the numerator ensures that dVal(w) will always have a finite value even when the number of occurrences is zero. This ensures that dVal can be multiplied meaningfully.

Then, for each two-word sequence(double) 'w', 'pw':

$$\text{sequence value } dVal(w, pw) = \frac{(\text{number of occurrences } (w, pw) * dVal(w))}{\text{Total number of 'pw' occurrences for this 'w'}}$$

The dVal value for the double is therefore increased by the number of times it occurs and by the frequency of occurrence of the basic word-stem w. The dVal value is moderated, however, by the number of pw occurrences for the stem word w in the denominator. Consequently, a double that includes a stem word that occurs with a large number of different previous words will obtain a lower value of dVal than a double containing a stem word that rarely occurs with a previous word.

For the triple word sequence 'w', 'pw', 'p2w':

$$dVal(w, pw, p2w) = \frac{(\text{number of occurrences } (w, pw, p2w) * dVal(w))}{\text{Total number of 'p2w' occurrences for this 'pw'}}$$

This equation is analogous to the previous one but using the second previous word p2w rather than the previous word pw. Consequently, a triple including a stem word that occurs with a lot of different second previous words will obtain a lower score than one which seldom occurs with second previous words. This equation can be used by analogy to process third previous words, fourth previous words and so on.

The process is repeated for all of the main stem words in the training texts as well as all of the multi-word sequences. Clearly there is a lot of room for modification of this procedure for example by deletion of words which occur very infrequently within the training data, or by increasing the number of groups, or by modifying the scores in each group and so on. A thesaurus function may be applied to ensure that common alternatives to particular words are also included.

Additionally, specific words and multi-word sequences can be placed in the database or the dVal for words and word sequences that exist in the training data but whose frequency is regarded as artificially low or high can be modified. Important words that might be absent from the training data are "morose" and "voluptuous".

Generation of the training data is now complete. Preferably, however, it is stored in a binary tree format to reduce the searching overhead. The actual format of a suitable database will be selected readily by the skilled person in dependence on the application.

The stored data is then used by the classification algorithm that is now described.

The Classification System

The purpose of the classification system is to apply the training data generated by the training system to a new text or texts which have yet to be classified. While the following description assumes that just one new text is being classified the system is equally applicable to classification of a large number of texts or block of texts at the same time. Where a block of texts is being processed this is done, preferably, axis by axis. In other words, axis 1 (e.g. Light-Heavy) is processed for all of the new texts and then processing proceeds to axis 2 and so on.

The procedure comprises the following steps conducted for each axis:

1. Obtain the training data which comprises three groups of data for the given axis. Each group will include a number of stem words, doubles and triples together with a number of occurrences (and/or a frequency indication such as dVal). If we consider the Happy-Sad axis then we can expect the stem "happi" to occur quite frequently in group G0 while the stem "sad" will occur quite frequently in the group G2. The double "not happi" would be likely to occur more frequently in Group G2.

2. The text is processed in the same way as described above for the training system, namely the pre-processing is applied and the stem words, doubles and triples are identified in the same manner. It is worth noting here that the procedure might be simplified by simply searching the new text for all the stem-words, doubles and triples stored in the training data. However, by applying exactly the same procedure as was used above a considerable economy of programming can be achieved.

We now have a database (preferably in the form of a binary tree) containing all of the stem words, doubles and triples from the training data together with their respective dVal values for a particular axis. We also have a database containing all of the triples, doubles and word stems found in the new text to be classified.

For each axis, calculate the probability of the new text belonging to each group on the axis:

$$p(Group \mid td \ \& \ t) = \prod_{\text{All Words in } t}^{w} p(w \mid pw, p2w, group)$$

This relates the probability of the text being allocated to a particular group on each axis on the basis of the training data, td and the text being classified, t. This is performed by multiplying (for every word) the probabilities of that word occurring in a document that is allocated to that group (based on the training data).

Of course, other formulae could be used in making the calculation.

One example of how the value p(w|pw, p2w, group) is calculated is shown below:

if w is not a common word does 'w', 'pw', 'p2w' exist in the group's training data yes->$p(w|pw, p2w, \text{group}) = d\text{Val}(w, pw, p2w) * \text{TripleConstant} * \Sigma(\text{occurrences of 'w'}, \text{'pw'}, \text{'p2w' in 't'})$ no->does 'w', 'pw' exist in the group's training data yes->$p(w|pw, p2w, \text{group}) = d\text{Val}(w, pw) * \text{PairConstant} * \Sigma(\text{occurrences of 'w'}, \text{'pw'}, \text{in 't'})$ no->does w exist in group's training data yes->$p(w) = d\text{Val}(w) * \Sigma(\text{occurrences of 'w' in 't'})$ no->$p(w) = \dfrac{1}{[\text{distinct stems in training axis} + \text{number of words in training group}]}$ The two constants, TripleConstant and PairConstant are worked out using the following equation: number of words in sequence$*2^{\text{number of words in sequence}}$ (these are, of course, only examples, and other values of weighting factor may be used.)

3. The training data is then searched for the occurrence of the first triple found in the new text. If it is present in the training data then the dVal for that triple is stored in a counter that logs the cumulative dVal values for each of the three groups in respect of that particular new text. In order to ensure that occurrence of triples has a greater effect than occurrence of doubles and word stems, the occurrence of a triples is preferably weighted. Thus the dVal value for the triple is multiplied (in this embodiment) by 24 before being added to the cumulative counter. Other values of weighting constant may be used.

If a match for the triple has been found then the processing continues to analyse further triples, doubles and word stems found in the new text.

If no match is found then the second previous word of the triple is discarded and a comparison is made between the remaining double and the training data. If a match is found then the dVal value for that double is stored in the cumulative counter for the relevant group for the new document (on the relevant axis, of course). In order to ensure that the occurrence of doubles has a greater effect on the cumulative dVal value for the new document the dVal value is multiplied (in this embodiment) by 8 before being added to the cumulative counter. Other values of weighting constant may be used.

If a match for the double is found then processing continues to analyse further triples, doubles and word stems found in the new text.

If no match is found for the double then the previous word is discarded and the search of the training data is repeated using only the word stem w. If a match is found then the relevant value of dVal is added to the cumulative counter for the group in which the word w is found. If no match is found for the word stem, then a dVal value having 1 in the numerator is recorded in a similar manner for the training algorithm.

Whether or not a match is found for the word stem, the processing continues to analyse the remainder of the new text. On reaching the end of the new text, processing continues by loading the training data for the next axis and repeating the comparisons. Once the new text has been fully analysed, a cumulative score of dVals will be stored for each group on each axis for the new text.

One example of the calculation performed is as follows:

Get largest p(Group)—The largest probability is taken and along with the group number and the 'id' of the text written to a Database for later processing by the 'spread' function.

The spread function is applied once a large number of texts are analysed using the technique above. To use the spread function it is assumed that the texts will represent all of the possible allocations of scores (0 to 11) on each of the axes. Each group is treated separately.

If we consider one axis, the classification algorithm will provide a probability value for each group on that axis for each text. This gives an indication of the likelihood that a given text should be classified in that group. If the likelihood is high then this will be reflected in the score given to that text. For example, on the Happy-Sad axis, a very high probability that a text should be in Group G0 would tend to indicate a very happy text. Consequently, that text should be given a score of 0. On the other hand, if a text has a very high probability that it should be classified in Group G2 then that text should be given a score of 10. If the probability value is lower then the scores can be increased (happy side) or decreased (sad side) as appropriate.

Texts classified in Group G1 are given a score of 5. Consequently, middle-ranking texts are all given a neutral value. Texts classified in Group G0 are given a score of between 0 and 4. And texts classified in Group G2 are given a score of between 6 and 10.

It will be appreciated that some stretching or spreading of the classification has occurred. To actually determine the score a probabilistic approach is taken. Taking the example of the Happy-Sad axis, again and considering those texts that have been classified in Group G0 (happy):

That percentage of texts with the highest probability value are given a score of 0.

The next percentage of texts with a lower probability are given a score of 1.

The next percentage of texts with a lower probability are given a score of 2.

The next percentage of texts with a lower probability are given a score of 3.

And the final percentage of texts are given a score of 4.

All of the texts within that group will then have been given a score. The process is repeated for texts having a probability of falling within group G2 so that these texts are given a score of between 6 and 10.

Retraining/Feedback

Retraining or feedback is an optional procedure that may improve the performance of the classification system (i.e. the certainty of classification) and increase its vocabulary. Those texts that have been classified by the system as having a high probability of falling into the extreme groups (for example the top 5%) or the neutral group on any axis are applied to the training algorithmfor those axes only.

Each selected text is then pre-processed and word stems and word stem sequences are extracted therefrom. These word stem and word stem sequences are then added to the particular group into which the text has been classified by the classification algorithm. The next step depends upon whether these words and word stem sequences are already present in the training data.

If they are already then the dVal value is recalculated in accordance with the previously defined equations.

If they are not already present then each new word stem or word stem sequence is added to the training data and dVal is calculated therefor.

The treatment of these "retraining" texts is thus analogous to the treatment of the training texts.

This feedback technique allows the training data to be automatically updated include new vocabulary and to reinforce the classification effectiveness of the system. A particular example would be the name of a new actor or director who becomes associated with a particular type of film (e.g. Almodovar, Van Damme and so on).

The Retrieval System

Once a set of texts has been allocated a score on each axis as described above they can be used by a retrieval system. The principle of operation of such a system is straightforward once the texts have been classified.

If we take the example of texts representing a synopsis of television programmes, the user may request the retrieval system to locate a programme that meets his particular requirements. One method for so doing is illustrated in FIG. 6 of the accompanying drawings. This shows a graphical user interface (GUI) that the user is presented with when he selects a FIND PROGRAMME function on his television set. Only three axes are shown in the Figure for the sake of clarity: Light-Heavy, Loving-Hateful and Violent-Gentle. On each axis is a slider S that can be manipulated by the user using any suitable GUI technique. For example the user may use navigation buttons on his remote control. The UP/DOWN buttons may be used to select a particular axis and once this is done the relevant slider is highlighted. The LEFT/RIGHT buttons may then be used to move the highlighted slider along the axis. Each slider may occupy 11 positions corresponding to the 11 scores per axis described above. Of course other techniques may be employed such as a touch screen or, in the case of a personal computer, a mouse or trackball. In any case the system is intuitive and easy to use without a requirement for any typing (although numeric scores could be entered if desired).

Once the user has adjusted all of the sliders he can press a FIND PROGRAMME button and fuzzy logic is then used to locate a programme that most closely matches his requirements. It is unlikely, of course, that a programme can be found that matches all of the scores he has selected on all axes but a close match or a number of the closest matches can be found and displayed to the user. He can then select one of the options and view the programme using the navigation buttons on his remote control. The techniques for applying fuzzy logic to match the scores of the user with those of the available programmes will be familiar to the skilled person and will not be repeated here. FIG. 7 shows a block schematic diagram of such a system. In this arrangement the classification of texts relating to television programmes and the matching of those classifications to user requirements is carried out remotely, for example at the premises of a cable television distributor.

A distributor site DS comprises a processor 10 connected to a database 12 and to a user's television set 14 via a cable. Clearly other communications techniques could be used to communicate with the user. Other features of the distributor site have been omitted for clarity.

A remote control 16 is usable to control an television set 14. Upon selection by the user a GUI such as that shown in FIG. 6 is displayed. Once the user has made his selections, the information is passed to the processor 10 at the DS. The processor 10 then applies fuzzy logic rules to the previously classified programs whose classifications are stored in the database 12. An option or a set of options are then displayed to the user who can use this to select his viewing. Of course, if the options do not appeal to the user he can amend his selections and request another set of options. This embodiment of the invention provides a classification system based on brief textural descriptions of television programmes (in Europe, for example, such data for all television programmes in all countries is provided by a company called Infomedia in Luxembourg.). Alternative search techniques, be they based on explicit user input or implied learning about user's tastes (or both), may then utilise the data generated to identify a television programme or programmes which most closely meet the user's requirements. For example, the user might wish to view a short but informative programme with a light hearted approach at some point during the evening. He can simply specify the required parameters on each of the relevant axis to obtain a recommendation or set of recommendations for viewing. This system is important (if not vital) when there are hundreds of possible channels to choose from. As a further alternative the system could operate in the user's absence to video record those programmes that best match his preferences.

In another embodiment a news feed is provided via the internet (or other delivery channel) to a personal computer PC processor on the user's desk. The user has pre-programmed his interests in categories of news that he wishes to have displayed on his PC as soon as they hit the wires. The pre-programming can be explicit using a menu-driven GUI, such as the one described above for example or implicit whereby the system learns the user's preferences from previous behaviour.

The processor in the user's PC then applies the classification algorithm to the incoming data (preferably using fuzzy logic) and places relevant newsflashes on the user's PC screen. This process can run continually in the background without the user being aware of it. As soon as some news relevant to the user's interests (eg The Dow Jones index, the Internet, biotechnology etc) is delivered via the news feed, it can be displayed to the user. The user will then give those items of news that are displayed his full attention because he knows that they have been "prefiltered" to match his requirements.

One or more natural language processing (NLP) techniques may be added to embodiments of the invention so as to run in parallel with the techniques described herein.

Additional advantages and modifications will readily occur to those skilled in the art. Therefore, the invention in its broader aspects is not limited to the specific details, representative devices, and illustrated examples shown and described herein. Accordingly, various features of the respectively disclosed embodiments can be used with other embodiments, and various modifications may be made without departing from the spirit or scope of the general inventive concept of the present invention as defined by the appended claims and their equivalents.

APPENDIX 1

| a | children | had | look | over | that | which |
|---|---|---|---|---|---|---|
| about | come | hand | looked | own | the | while |
| above | could | hard | made | page | their | white |
| after | country | has | make | paper | them | who |
| again | day | have | man | part | then | why |
| air | days | he | many | parts | there | will |
| all | did | head | may | people | these | with |
| almost | different | help | me | picture | they | without |
| along | do | her | men | place | things | word |

APPENDIX 1-continued

| | | | | | | |
|---|---|---|---|---|---|---|
| also | does | here | might | put | think | words |
| always | don't | high | more | read | this | work |
| an | down | him | most | right | those | world |
| and | each | his | mother | said | thought | would |
| animals | earth | home | Mr. | same | three | write |
| another | end | house | much | saw | through | year |
| any | enough | how | must | say | time | years |
| are | even | I | my | school | times | you |
| around | ever | if | name | second | to | your |
| as | every | important | near | see | together | |
| asked | eyes | in | need | sentence | too | |
| at | far | into | never | set | took | |
| away | father | is | new | she | two | |
| back | feet | it | next | should | under | |
| be | few | its | night | show | until | |
| because | find | just | no | side | up | |
| been | first | keep | not | since | us | |
| before | following | kind | now | small | use | |
| began | food | know | number | so | used | |
| being | for | land | of | some | very | |
| below | form | large | off | something | want | |
| between | found | last | often | sometimes | was | |
| big | four | left | old | soon | water | |
| both | from | let | on | sound | way | |
| boy | get | life | once | still | we | |
| boys | give | light | one | story | well | |
| but | go | like | only | study | went | |
| by | going | line | or | such | were | |
| called | good | little | other | take | what | |
| came | got | live | our | tell | when | |
| can | great | long | out | than | where | |

APPENDIX 2

| | | |
|---|---|---|
| a | man | us |
| about | me | use |
| after | men | used |
| air | mother | want |
| an | mr | was |
| and | my | water |
| are | name | way |
| as | night | we |
| at | of | well |
| be | off | went |
| been | on | were |
| but | our | what |
| by | own | when |
| can | page | white |
| come | paper | who |
| could | picture | why |
| did | read | with |
| do | said | word |
| end | school | words |
| even | sentence | work |
| eyes | she | write |
| food | side | year |
| for | so | years |
| get | sound | you |
| give | tell | your |
| go | than | |
| had | that | |
| he | the | |
| her | their | |
| him | them | |
| his | then | |
| house | there | |
| if | these | |
| in | they | |
| is | things | |
| it | this | |
| its | those | |
| land | to | |
| life | too | |
| Line | up | |

We claim:

1. An automatic text classification system comprising:
   means for extracting word stems and word stem sequences from data representing a text to be classified;
   means for calculating a probability value for the text to be classified with respect to each of a plurality of qualities base on a correlation between (i) the extracted word stems and word stem sequences and (ii) predetermined training data;
   wherein each quality is represented by an axis that is divided into a plurality of groups and whose two end points correspond to mutually exclusive characteristics;
   wherein the probability value with respect to each of the plurality of qualities is converted into a score on each axis indicating a likelihood of the text having one or the other of the mutually exclusive characteristics;
   wherein the training data is derived from a plurality of training texts that have been pre-classified with respect to each of the plurality of qualities, and the training data comprises a distribution value of each word stem and each word stem sequence in each of the plurality of training texts with respect to each of the plurality of qualities;
   wherein each of the training texts has been pre-classified into one of the groups on each axis;
   wherein the training data comprises a database of, for each group on each axis, the distribution value of each word stem and word stem sequence in each training text with respect to the one group on each axis into which each training text has been pre-classified;
   wherein the distribution values represent a probability of each word stem and word stem sequence existing in a group on a given axis; and
   wherein the probability values of the text to be classified represent a probability of the text being classified in each group on each axis.

2. The automatic text classification system according to claim 1, wherein each of the training texts has been pre-classified with a specific score on each axis, and each group on each axis comprises a predetermined range of scores.

3. The automatic text classification system according to claim 2, wherein the training texts are selected so that the pre-classified scores are distributed along each axis between a Bell curve and a flat distribution.

4. The automatic text classification system according to claim 3, wherein:
   each axis is divided into a first group, a neutral second group, and a third group; and
   the neutral second group with respect to the pre-classification of the training texts is broader than the neutral second group with respect to the text to be classified, so that the probability values of the text to be classified are more likely to be converted into scores which fall on an appropriate side of each axis.

5. The automatic text classification system according to claim 1, wherein:
   each word stem is a main stem word that is not a common word;
   a modifying word is a common word that adds meaning to a main stem word; and
   each word stem sequence comprises a main stem word and one or more previous words that are either modifying words or other main stem words.

6. The automatic text classification system according to claim 5, wherein the probability values are calculated such that a correlation between an extracted triple word stem sequence with the training data is more heavily weighted than a correlation between an extracted double word stem sequence with the training data, and such that a correlation between an extracted double word stem sequence with the training data is more heavily weighted than a correlation between a single extracted word stem with the training data.

7. A system for producing training data comprising:

means for extracting word stems and word stem sequences from each of a plurality of training texts that have been pre-classified with respect to each of a plurality of qualities; and means for calculating a distribution value of each extracted word stem and word stem sequence in each training text with respect to each of the plurality of qualities;

wherein each quality is represented by an axis that is divided into a plurality of groups and whose two end points correspond to mutually exclusive characteristics;

wherein each of the training texts has been pre-classified into one of the groups on each axis;

wherein the training data comprises a database of, for each group on each axis, a distribution value of each word stem and word stem sequence in each training text with respect to the one group on each axis into which each training text has been pre-classified; and wherein the distribution values represent a probability of each word stem and word stem sequence existing in a given group on a given axis.

8. The system for producing training data according to claim 7, wherein each of the training texts has been pre-classified with a specific score on each axis, and each group on each axis comprises a predetermined range of scores.

9. The system for producing training data according to claim 8, wherein the training texts are selected so that the pre-classified scores are distributed along each axis between a Bell curve and a flat distribution.

10. The system for producing training data according to claim 7, wherein:

each word stem is a main stem word that is not a common word;

a modifying word is a common word that adds meaning to a main stem word; and each word stem sequence comprises a main stem word and one or more previous words that are either modifying words or other main stem words.

11. A system for producing training data comprising:

means for extracting word stems and word stem sequences from each of a plurality of training texts that have been pre-classified with respect to each of a plurality of qualities; and means for calculating a distribution value of each extracted word stem and word stem sequence in each training text with respect to each of the plurality of qualities;

means for, after a plurality of new texts have been classified with respect to the plurality of qualities using the training data, selecting a number of the new texts that have been classified with a predetermined degree of probability with respect to at least one of the plurality of qualities;

means for extracting word stems and word stem sequences from each of the selected new texts; and means for one of (i) recalculating the distribution value of each extracted word stem and word stem sequence which is already present in the training data, and (ii) calculating an initial distribution value of each extracted word stem and word stem sequence which is not already present in the training data.

12. A retrieval system comprising:

means for accessing a database comprising a plurality of word stems and word stem sequences that have been extracted from a plurality of texts, a plurality of identifiers associating each word stem and word stem sequence with at least one of the plurality of texts, and correlation data between (i) each word stem and word stem sequence and (ii) each of a plurality of qualities in terms of which the plurality of texts have been classified;

means for receiving user preference data in terms of at least one of the plurality of qualities;

means for identifying word stems and word stem sequences corresponding to the user preference data based on the correlation data stored in the database; and means for identifying at least one of the plurality of texts that best matches the user preference data based on the identified word stems and word stem sequences and the plurality of identifiers stored in the database;

wherein each quality is represented by an axis that is divided into a plurality of groups and whose two end points correspond to mutually exclusive characteristics;

wherein each of the plurality of texts has been classified into one of the groups on each axis;

wherein the correlation data comprises, for each group on each axis, a distribution value of each word stem and word stem sequence in each text with respect to the one group on each axis into which each text has been classified; and wherein the distribution values represent a probability of each word stem and word stem sequence existing in a given group on a given axis.

13. The retrieval system according to claim 12, wherein:

each word stem is a main stem word that is not a common word;

a modifying word is a common word that adds meaning to a main stem word; and each word stem sequence comprises a main stem word and one or more previous words that are either modifying words or other main stem words.

14. The retrieval system according to claim 12, further comprising a graphical user interface for enabling input of the user preference data.

* * * * *